May 11, 1943.  C. F. WEBB ET AL  2,318,727

INDICATOR FOR SYNCHRONOUS ELECTRICAL CONTROL SYSTEMS

Filed Feb. 13, 1941  2 Sheets-Sheet 1

INVENTORS
Christopher
Frederick Webb
and
Norman Ernest
BY Brewerton

Bennett Harding
ATTORNEYS.

May 11, 1943.   C. F. WEBB ET AL   2,318,727
INDICATOR FOR SYNCHRONOUS ELECTRICAL CONTROL SYSTEMS
Filed Feb. 13, 1941   2 Sheets-Sheet 2
Fig. 3.
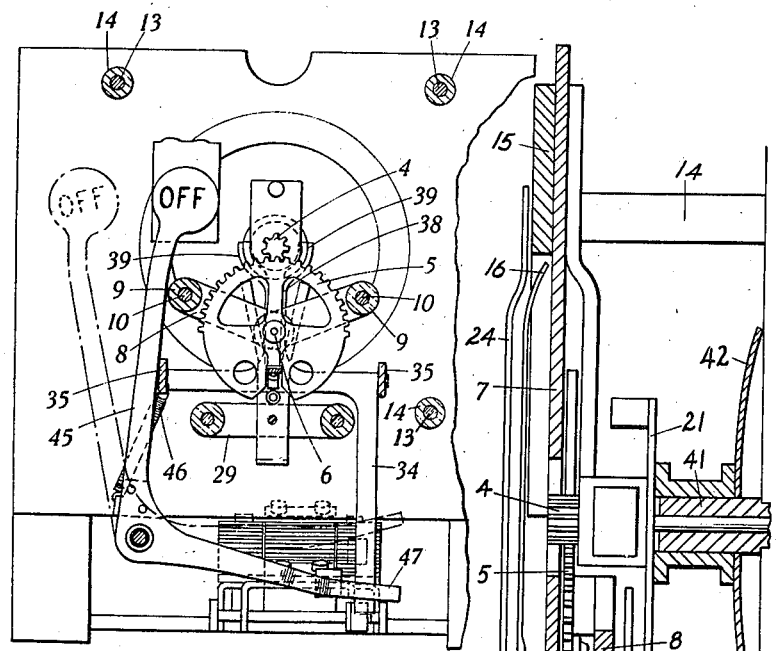
Fig. 4.
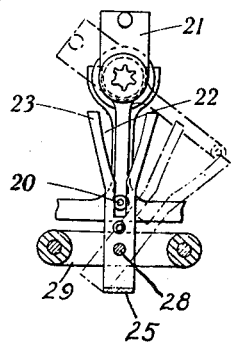
Fig. 5.
INVENTORS
Christopher Frederick Webb
and Norman Ernest Brewerton
BY
Brewer Harding
ATTORNEYS Patented May 11, 1943

2,318,727

UNITED STATES PATENT OFFICE 2,318,727

INDICATOR FOR SYNCHRONOUS ELECTRICAL CONTROL SYSTEMS

Christopher Frederick Webb and Norman Ernest Brewerton, Uxbridge, England, assignors to Bell Punch Company Limited, London, England, a British company Application February 13, 1941, Serial No. 378,782
In Great Britain February 6, 1940

3 Claims. (Cl. 116—124)

This invention relates to synchronous electrical control systems.

One known form of synchronous control system employs a so-called transmitter at one point and a receiver at another point remote from the first point, the arrangement being such that when a rotor in the transmitter is rotated through an angle a rotor in the receiver is automatically caused to rotate through the same angle. Associated with the receiver is a dial and pointer, the latter being directly mounted on or otherwise connected to the rotor spindle in the receiver and being arranged to move over the dial which itself is rotatable about its centre and is connected to the member or part to be controlled. Normally the pointer lies at zero on the dial but when the rotor in the receiver revolves in dependence on the rotation of the rotor in the transmitter the pointer moves over the dial, which is graduated in degrees, to indicate the angle of rotation of the receiver rotor and hence of the transmitter rotor. After the pointer has come to rest the dial is rotated by actuation of suitable hand or power operated means until its zero point is again aligned with the pointer, such operation of the hand or power means serving also to move the member or part to be controlled through the same angle as that through which the dial has been moved and hence through the same angle as that through which the rotor in the transmitter was originally moved.

The system above described suffers, however, from the disadvantage that unless the dial is made comparatively large it is difficult to ensure the exact alignment of the pointer with the zero on the dial. It is the object of the present invention to overcome this disadvantage in a simple and efficient manner.

According to the invention there is provided, in or for a synchronous control system, a receiver having a rotor and an angularly displaceable pointer adapted to be moved upon displacement of the rotor through a predetermined angle and movement transmission means effecting, over a predetermined range, a mechanical magnification of the angular movement of the pointer in relation to that of the rotor for the purpose of observing with greater accuracy the reading of the pointer position at or near the zero position. Said movement transmission means preferably comprise a driving pin carried by a member displaceable angularly with the rotor and a forked or slotted member connected with the pointer and arranged so that, upon engagement of the driving pin with the fork or slot, such pointer will receive an angular displacement considerably greater than that imparted to the rotor.

In order that the said invention may be clearly understood and readily carried into effect the same will now be more fully described with reference to the accompanying drawings, in which:

Fig. 3 is another sectional view taken on the line III—III of Fig. 2;

Fig. 4 is a detail view of the means provided for effecting the displacement of the zero-ising pointer; and Fig. 5 is an enlarged view of a portion of Fig. 2.

Figure 1:
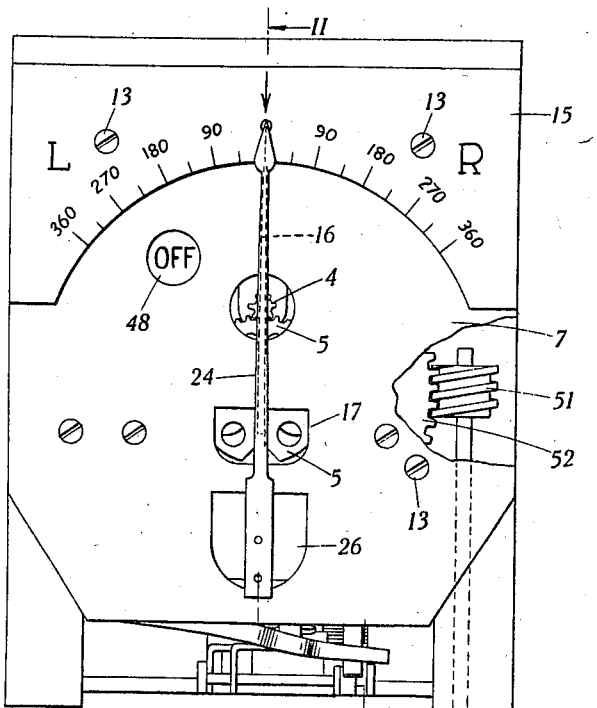
Fig. 1 is a front elevation of a part of a receiver incorporating the invention.

In the form of the invention illustrated in the accompanying drawings, 1 indicates the receiver stator, 2 indicates the receiver rotor and 3 indicates the spindle of the latter. To the end of the said spindle is secured a small pinion 4 meshing with a toothed wheel or segment 5 which is carried by a pin or spindle 6 having one end thereof journalled in a front plate 7 and its other end journalled in the central portion of a V-shaped bracket 8 that is mounted in position on and spaced from the rear face of the said front plate as, for example, by a pair of pins 10 and spacing washers 9.

Figure 2:
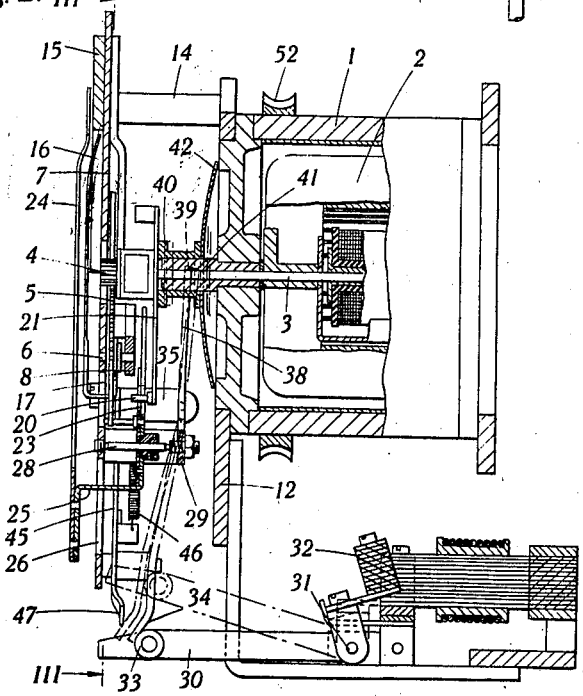
Fig. 2 is a side view, partly in section, of the receiver shown in Fig. 1, the section being taken on the line II—II of Fig. 1.

As may be seen from Fig. 2, the receiver stator is carried by a plate or frame 12 and the aforesaid front plate 7 is arranged so that it is spaced from and is supported by the plate 12, for example, by three pins 13 provided with spacing sleeves 14 (Fig. 3).

To the front plate 7 is secured a graduated scale plate 15 adjacent to which moves the free end of a pointer 16 the other end of which extends through a slot 17 in the front plate and is secured to the toothed wheel or segment 5. Normally the pointer 16 is in a vertical position in alignment with the zero on the scale plate. When, however, rotation of the receiver rotor is produced as a result of rotation of the transmitter rotor, the pointer 16 is swung, owing to the fact that the pinion 4 is meshing with the toothed wheel or segment 5, away from the zero, either to the right or to the left (Fig. 1), depending upon the direction of rotation of the receiver rotor. It will be noted that the receiver rotor may be rotated through 360° in either direction but that, with the gearing employed, the angular movement of the pointer is considerably less.

Now, as indicated above, unless the scale is made comparatively large, it is difficult to ensure the exact alignment of the pointer with the zero on the scale when again bringing the parts and the pointer to zero, and, in accordance with the present invention, means is provided whereby a small rotation of the receiver rotor is adapted, over a range in the vicinity of the zero reading, to produce a comparatively large movement of an indicator or zero-ising pointer over the scale. As illustrated, the said means comprises a pin-and-slot mechanism in which a pin 20 is secured to a member or counter-weighted arm 21 movable angularly with the rotor spindle 3 and is adapted for engagement in a V-shaped slot 22 formed in a forked shaped member 23 which is pivotally mounted in position on the frame of the receiver and is provided with a relatively long zero-ising pointer 24 adapted to be moved over the scale plate 15 with an enlarged or amplified movement whilst the pointer 16 is in the immediate vicinity of the zero reading. As will be seen, the zero-ising pointer, when at zero, overlies the pointer 16 and has its lower end secured to an L-shaped bracket 25 which extends through a slot 26 in the front plate 7 and is secured to the lower end of the forked shaped member 23 and the latter is carried by a pin 28 having one end journalled in the front plate and its other end journalled in a bracket 29 which is carried by and spaced from the rear face of the front plate, the arrangement being such that, when the zero-ising pointer is at zero, the pin 20 is disposed at the base of the slot and in a parallel-walled portion formed thereat whilst, when receiver rotor is displaced in either direction by even a small amount, the forked member will be displaced to cause a relatively large angular movement to be imparted to the zeroising pointer.

Thus, the operation of the arrangement above described is as follows:

Normally, the pointer 16 and the zeroising pointer 24 are in a vertical position in alignment with the zero reading on the scale. When rotation of the receiver rotor is produced as a result of rotation of the transmitter rotor, the pointers are swung away from the zero in a direction depending on the direction of rotation of the receiver rotor and, during the initial part of the movement of the rotor, the pointers 16 and 24 are displaced differentially so that a comparatively large movement of the pointer 24 over the scale is produced. As soon as, however, the rotor has rotated through an amount, e. g. 10 or 20 degrees, sufficient to cause the pin 20 to disengage the slot in the forked member 23, as is shown by the chain dotted lines in Fig. 4, the pointer 24 will not be further displaced relatively to the scale although the rotor and the pointer 16 may continue to move until movement of the transmitter rotor ceases.

After the receiver rotor has been brought to rest, the receiver stator is rotated by suitable operation of hand or power means, as for instance by a shaft 50 and a worm 51 engaging with a worm wheel 52 attached to the stator, in a direction opposite to that in which the receiver rotor was originally rotated, such rotation serving also to revolve the rotor in the said opposite direction. For this purpose, the receiver stator 1 is rotatably mounted in the mounting constituted by the plate 12. Operation of the hand or power means is continued until the pointers have been restored to their zero positions and, in this connection, it will be appreciated that an accurate restoration of the rotor to its initial position is made possible by reason of the fact that, as the pointer 16 approaches the zero position, the pin and slot mechanism above described is brought into operation to effect a displacement of the zero-ising pointer 24 under such conditions that a small movement of the rotor produces a comparatively large movement of the zero-ising pointer over the scale until the zero position is reached. Operation of the hand or power means also serves to move the member or part to be controlled, e. g. a gun mounting or other device which it is the purpose of the receiver to control, and when operation of the said means is eventually discontinued, the pointers having been reset at zero, the said member or part will have been moved through precisely the same angle as that through which the transmitter rotor was originally rotated.

The receiver rotor may be moved independently of the transmitter rotor when no current is being supplied to the system and to ensure that the receiver rotor will align itself correctly with the transmitter rotor when the current is switched on, there is preferably provided on the transmitter a switch which can only be operated when the transmitter is in the centre of its normal operating arc. Also, means such as an electrically operated brake may be provided on the receiver so that it is adapted to cause the rotor to be locked to the stator during any movement of the latter when the current is off. In the arrangement illustrated, the aforesaid means comprises an arm 30 pivoted at 31 and adapted to be moved by electrically operable means including an armature 32 from the full line position into the dotted line position shown in Fig. 2. At or near its free end the arm is provided with a roller 33 bearing against the free end of a lever 34 which is L-shaped in form and is pivotally mounted in a pair of brackets 35 projecting rearwardly from the front plate 7. Said lever is also provided with an upwardly extending arm 38 terminating in a forked-shaped end having two prongs 39 engaging opposite sides of a flanged brake bobbin 40 which is slidably mounted on the rotor spindle bush 41. The said brake bobbin bears at one end against the rear surface of the arm 21 and at its other end against a brake spring consisting for example, of an arched spring strip 42 provided with a central opening through which the bush 41 extends and arranged so that the ends thereof bear against the end of the stator 1. The arrangement is such that, in the 'off' position of the brake (shown in full lines in Fig. 2), the prongs 39 lie between the flanged ends of the brake bobbin and the spring 42 serves to press the bobbin against arm 21 and thereby frictionally couple the stator to the rotor. When, however, the current is turned on and the switch is operated, the arms 30 and 38 are moved into the dotted line positions shown in Fig. 2 with the result that the brake bobbin is moved endwise to compress the spring 42 and the coupling is broken.

If desired, means may also be provided for visually indicating when the current is on and the brake off and, for this purpose, a bell-crank lever 45 may be pivotally mounted in position on the rear face of the front plate so that it is adapted to be moved, in opposition to a spring 46, for the purpose of uncovering a signal plate bearing the word 'on' as the brake is moved into the 'off' position. Said bellcrank lever is conveniently arranged so that the end 47 thereof is adapted to be displaced by the free end of the arm 30 whilst the other end of the bell-crank lever is displaced to move a flag with the word 'off' engraved thereon from beneath an opening 48 in the front plate so as to reveal the word 'on' on the signal plate.

What we claim and desire to protect by Letters Patent is:

1. In a device of the type described, an angularly movable rotor, a main pointer, means through which the rotor moves said main pointer in accordance with the angular movements of said rotor, an auxiliary pointer, and mechanical amplifying means for effecting magnified angular movements of said auxiliary pointer with respect to said main pointer only when said main pointer is in a predetermined range of its movement, said mechanical amplifying means comprising a driving pin having angular movements substantially proportional to the rotor movements and a pivoted member connected to said auxiliary pointer and provided with a slot receiving said driving pin closely adjacent its pivot to effect an angular movement of said pivoted member substantially greater than the corresponding driving angular movement of the pin when there exists said closely adjacent relationship of the pin and pivot.

2. In a device of the type described, an angularly movable rotor, a pointer, an index member with which said pointer cooperates, and mechanical amplifying means for effecting magnified angular movements of said pointer only when said rotor is in a predetermined range of its movement, said mechanical amplifying means comprising a driving pin having angular movements substantially proportional to the rotor movements and a pivoted member connected to said pointer and provided with a slot receiving said driving pin closely adjacent its pivot to effect an angular movement of said pivoted member substantially greater than the corresponding driving angular movement of the pin when there exists said closely adjacent relationship of the pin and pivot.

3. In a device of the type described, an angularly movable rotor, zero indicating means, an index member with which said indicating means cooperates, and mechanical amplifying means for effecting magnified angular movements of said indicating means only when said rotor is in a predetermined range of its movement, said mechanical amplifying means comprising a driving pin having angular movements substantially proportional to the rotor movements and a pivoted member carrying said indicating means and provided with a slot receiving said driving pin closely adjacent its pivot to effect an angular movement of said pivoted member substantially greater than the corresponding driving angular movement of the pin when there exists said closely adjacent relationship of the pin and pivot.

CHRISTOPHER FREDERICK WEBB.
NORMAN ERNEST BREWERTON.